United States Patent
Waibel

(10) Patent No.: US 9,524,295 B2
(45) Date of Patent: *Dec. 20, 2016

(54) SIMULTANEOUS TRANSLATION OF OPEN DOMAIN LECTURES AND SPEECHES

(71) Applicant: Facebook, Inc., Menlo Park, CA (US)

(72) Inventor: Alexander Waibel, Murrysville, PA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,045

(22) Filed: Jul. 10, 2015

(65) Prior Publication Data

US 2015/0317306 A1    Nov. 5, 2015

Related U.S. Application Data

(63) Continuation of application No. 13/675,775, filed on Nov. 13, 2012, now Pat. No. 9,128,926, which is a
(Continued)

(51) Int. Cl.
    *G06F 17/28*      (2006.01)
    *G06F 17/20*      (2006.01)
    (Continued)

(52) U.S. Cl.
    CPC ............. *G06F 17/289* (2013.01); *G06F 17/28* (2013.01); *G06F 17/2818* (2013.01);
    (Continued)

(58) Field of Classification Search
    USPC ............ 704/1–3, 5, 8, 9, 235, 258, 270–275
    See application file for complete search history.

(56) References Cited

U.S. PATENT DOCUMENTS 6,067,514 A * 5/2000 Chen ..................... G10L 15/18
                                                      704/235
6,148,105 A * 11/2000 Wakisaka ............ G06F 17/2755
                                                      382/190
(Continued)

FOREIGN PATENT DOCUMENTS

JP    H03-282776 A     12/1991
JP    H04-319769 A     11/1992
(Continued)

OTHER PUBLICATIONS

Stolcke et al, "Automatic linguistic segmentation of conversational speech," 1996, in Spoken Language, 1996. ICSLP 96. Proceedings., Fourth International Conference on , vol. 2, no., pp. 1005-1008 vol. 2, 3-6.*

(Continued)

*Primary Examiner* — Olujimi Adesanya
(74) *Attorney, Agent, or Firm* — Fenwick & West LLP

(57) ABSTRACT

Speech translation systems and methods for simultaneously translating speech between first and second speakers, wherein the first speaker speaks in a first language and the second speaker speaks in a second language that is different from the first language. The speech translation system may comprise a resegmentation unit that merge at least two partial hypotheses and resegments the merged partial hypotheses into a first-language translatable segment, wherein a segment boundary for the first-language translatable segment is determined based on sound from the second speaker.

18 Claims, 10 Drawing Sheets

Related U.S. Application Data continuation-in-part of application No. 13/310,258, filed on Dec. 2, 2011, now Pat. No. 8,504,351, which is a continuation of application No. 11/925,048, filed on Oct. 26, 2007, now Pat. No. 8,090,570.

(60) Provisional application No. 60/854,586, filed on Oct. 26, 2006.

(51) Int. Cl.
| | | |
|---|---|---|
| G10L 15/00 | (2013.01) | |
| G10L 15/26 | (2006.01) | |
| G10L 13/00 | (2006.01) | |
| G10L 21/00 | (2013.01) | |
| G10L 25/00 | (2013.01) | |
| G10L 15/04 | (2013.01) | |
| G10L 15/22 | (2006.01) | |

(52) U.S. Cl.
CPC ............ *G10L 15/005* (2013.01); *G10L 15/04* (2013.01); *G10L 15/26* (2013.01); *G10L 2015/226* (2013.01)

(56) References Cited

U.S. PATENT DOCUMENTS

| | | | | |
|---|---|---|---|---|
| 6,266,642 B1* | 7/2001 | Franz | ................... | G06F 17/271 704/257 |
| 6,356,865 B1 | 3/2002 | Franz et al. | | |
| 6,721,697 B1* | 4/2004 | Duan | ................... | G06F 17/277 704/2 |
| 6,826,582 B1* | 11/2004 | Chatterjee | ......... | G06F 17/30067 |
| 7,539,619 B1 | 5/2009 | Seligman et al. | | |
| 7,552,053 B2* | 6/2009 | Gao | ........................ | G10L 15/26 704/258 |
| 7,668,718 B2* | 2/2010 | Kahn | ................... | G10L 15/063 704/270 |
| 2002/0169592 A1* | 11/2002 | Aityan | ................. | G06F 17/289 704/2 |
| 2003/0115059 A1* | 6/2003 | Jayaratne | ............. | G06F 17/289 704/235 |
| 2005/0119899 A1 | 6/2005 | Palmquist | | |
| 2005/0228641 A1* | 10/2005 | Chelba | .................... | G06F 17/27 704/9 |
| 2005/0288922 A1* | 12/2005 | Kooiman | ................ | G10L 15/22 704/208 |
| 2006/0293896 A1* | 12/2006 | Nakagawa | ............. | G10L 15/26 704/270 |
| 2007/0032225 A1 | 2/2007 | Konicek et al. | | |
| 2007/0043567 A1* | 2/2007 | Gao | ........................ | G10L 15/26 704/257 |
| 2007/0071206 A1* | 3/2007 | Gainsboro | .......... | H04M 3/2281 379/168 |
| 2007/0124131 A1* | 5/2007 | Chino | ................... | G06F 9/4443 704/3 |
| 2007/0133437 A1* | 6/2007 | Wengrovitz | ............ | H04M 3/56 370/260 |
| 2007/0136068 A1* | 6/2007 | Horvitz | ................. | G06F 17/289 704/270 |
| 2008/0103907 A1 | 5/2008 | Maislos et al. | | |
| 2008/0240379 A1 | 10/2008 | Maislos et al. | | |
| 2009/0076792 A1* | 3/2009 | Lawson-Tancred | .. | G06F 17/212 704/2 |

FOREIGN PATENT DOCUMENTS

| | | | |
|---|---|---|---|
| JP | H05-189481 A | 7/1993 | |
| JP | H05-197744 A | 8/1993 | |
| JP | H08-329088 A | 12/1996 | |
| JP | H09-134192 A | 5/1997 | |
| JP | H10-97286 A | 4/1998 | |
| JP | H11-352994 A | 12/1999 | |
| JP | 2000-305930 A | 11/2000 | |
| JP | 2001-325254 A | 11/2001 | |
| JP | 2002-91963 A | 3/2002 | |
| JP | 2002-207495 A | 7/2002 | |
| JP | 2003-288339 A | 10/2003 | |
| WO | WO 2009/129315 A1 | 10/2009 | |

OTHER PUBLICATIONS

Shriberg et al, "Prosody-based automatic segmentation of speech into sentences and topics", 2000, In Speech Commun., pp. 127-154.*

Okumura et al, "An automatic speech translation system for travel conversation", 2002, In NEC Research and Development, 43(1), pp. 37-40.*

Stolke et al, "Dialogue Act Modeling for AutomaticTagging and Recognition of Conversational Speech", 2000, In Computational Linguistics 26(3):, pp. 339-373.*

Stolcke, "Modeling linguistic segment and turn-boundaries for n-best rescoring of spontaneous speech," 1997, in Proc. Eurospeech, 1997, vol. 5, pp. 1-4.*

Fugen et al, "Open Domain Speech Translation: From Seminars and Speeches to Lectures", Jun. 19-21, 2006, Barcelona Spain, TC-Star Workshop on Speech-to-Speech Translation, pp. 81-86.*

Vogel et al, "The ISL statistical translation system for spoken language translation," In Proc. of the International Workshop on Spoken Language Translation, Kyoto, Japan, 2004, pp. 65-72.*

Kohler et al, "Rapid porting of ASR-systems to mobile devices," in Proc. of the 9th European Conference on Speech Communication and Technology, Sep. 2005, pp. 233-236.*

Paulik et al, "Document driven machine translation enhanced ASR", European Conference on Speech Communication and Technology, Interspeech, Sep. 2005, pp. 1-4.*

Matusov et al, "Evaluating Machine Translation Output with Automatic Sentence Segmentation," in Proc. of IWSLT 2005, pp. 148-154, Oct. 2005.*

Hurst, "Indexing, Searching, and Skimming of Multimedia Documents Containing Recorded Lectures and Live Presentations", 2003, In Proc. of ACM Multimedia, pp. 1-2.*

Nanjo et al, "Language Model and Speaking Rate Adaptation for Spontaneous Presentation Speech Recognition", Jul. 2004, IEEE Transactions of Speech and Audio Processing, vol. 12, No. 4, pp. 391-400.*

Kashioka "Translation unit concerning timing of simultaneous translation" LREC-2002: Third International Conference on Language Resources and Evaluation. Proceedings, Las Palmas de Gran Canaria, Spain, May 27-Jun. 2, 2002; pp. 142-146.*

Leggetter et al, "Maximum likelihood linear regression for speaker adaptation of continuous density hidden Markov models", 1995, In Comput. Speech Lang., vol. 9, pp. 171-185.*

Okumura et al, "An Automatic Speech Translation System for Travel Conversation", 2002, In Proc. ARPA Human Language Technology Workshop,pp. 411-412.*

European Patent Office, European Search Report and Opinion, European Patent Application No. 14190061.3, Jul. 2, 2015, ten pages.

European Patent Office, Examination Report, European Patent Application No. 11702324.2, Sep. 28, 2015, four pages.

Japan Patent Office, Office Action, Japanese Patent Application No. 2011-505169, Jul. 7, 2015, twenty-three pages.

* cited by examiner

SIMULTANEOUS TRANSLATION OF OPEN DOMAIN LECTURES AND SPEECHES

PRIORITY CLAIM

This application is a continuation of U.S. Nonprovisional patent application Ser. No. 13/675,775, filed on Nov. 13, 2012, which is a continuation-in-part of U.S. Nonprovisional patent application Ser. No. 13/310,258, filed on Dec. 2, 2011 and issued as U.S. Pat. No. 8,504,351 on Aug. 6, 2013, which is a continuation of U.S. Nonprovisional patent application Ser. No. 11/925,048, filed on Oct. 26, 2007 and issued as U.S. Pat. No. 8,090,570 on Jan. 3, 2012, which claims priority to Provisional Patent Application No. 60/854,586, filed on Oct. 26, 2006, all of which are incorporated herein by reference in their entirety.

BACKGROUND

Growing international information strictures and decreasing travel costs could make the dissemination of knowledge in this globalized world easier if language banners could be overcome. Lectures are a very effective method of knowledge dissemination. Such personalized talks are the preferred method because they allow the speakers to tailor their presentation toward a specific audience, and in return allow the listeners to get the most relevant information through interaction with the speaker. In addition, personal communication fosters the exchange of ideas, allows for collaboration, and forms ties between distant units, e.g. scientific laboratories or companies. At the same time it is desirable to allow the presenters of talks and lectures to speak in their native language because, no matter how proficient in a foreign language, one will always feel more confident speaking in their native tongue. To overcome this obstacle human translators are currently the only solution. Unfortunately, translation services are often prohibitively expensive such that many lectures are not given at all as a result of language barriers. Thus, there is a need for systems and methods that use machine translation techniques to provide translation services at no or low cost to a wide audience, making it possible to overcome language barriers and bring people closer together.

SUMMARY

In various embodiments, the present invention is directed to a real-time open domain speech translation system for simultaneous translation of a spoken presentation that is a spoken monologue comprising one of a lecture, a speech, a presentation, a colloquium, and a seminar. The system includes an automatic speech recognition unit configured for accepting sound comprising the spoken presentation by a speaker in a first language. The system may also include a resegmentation unit for continuously creating word hypotheses of the spoken presentation in real time while the speaker is speaking, merging at least two partial hypothesis of recognized speech by the speaker, and resegmenting the merged partial hypothesis in a translatable segment. Segment boundaries for the translatable segments may be determined using back channel information (e.g., sound) from a listener (or listeners) of the presentation. The system may also comprise a machine translation unit that translates the translatable segment into a second language.

Those and other details, objects, and advantages of the present invention will become better understood or apparent from the following description and drawings showing embodiments thereof.

BRIEF DESCRIPTION OF THE FIGURES

Various embodiments of the present invention are described herein by example with reference to the following figures, wherein.

DESCRIPTION

Figure 1:
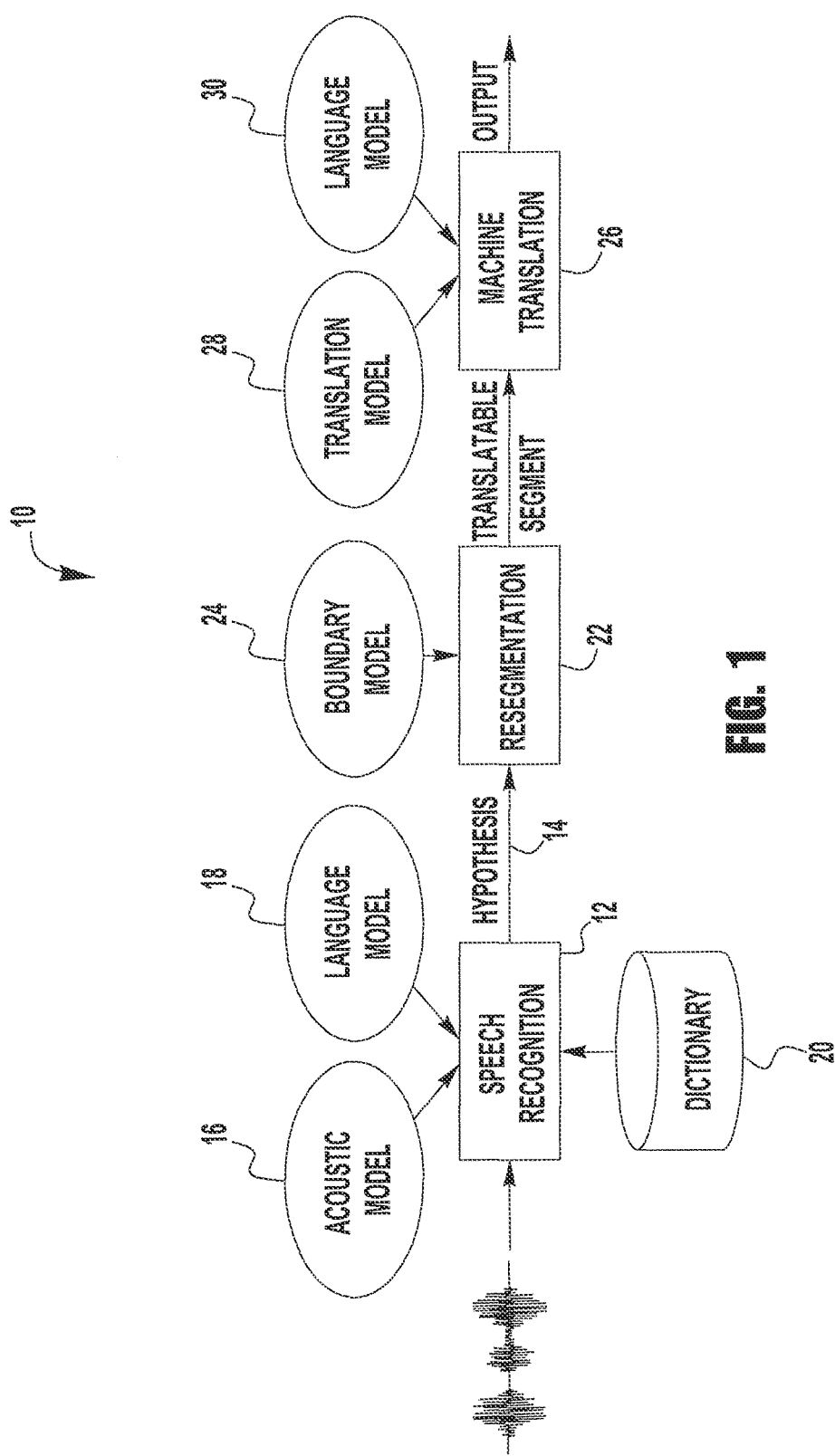
FIG. 1 illustrates a schematic overview of an embodiment of a simultaneous translation system 10 and its models.

Various embodiments of the present invention describe methods and apparatuses for open domain speech translation. Embodiments may be used to simultaneously translate, in real time, unlimited or open domain lectures and other spoken presentations or monologues such as, for example, parliamentary sessions using automatic speech recognition (ASR) techniques. Embodiments may be used to translate such presentations from one language into one or more target languages such as, for example, translating lectures on a new domain from English to Spanish and German. In various embodiments, small amounts of lecture data were used to improve system performance by using language model adaptation with similar web data. Lectures, seminars and presentations of any kind present problems for domain-unlimited speech translation because of the spontaneity of free speech, disfluencies, and ill-formed spontaneous natural discourse, the specialized vocabularies, topics, acronyms, named entities and expressions in typical lectures and presentations (by definition specialized content), the real-time & low-latency requirements, online adaptation to achieve simultaneous translation, and selection of translatable chunks or segments.

To address these problems in ASR and MT engines, embodiments of the present invention speed up recognition by adapting acoustic and language models to individual speakers. Also, in various embodiments the size of the acoustic model is restricted and the search space is more rigorously pruned. Further, in various embodiments, to adapt to a particular speaking style and domain, the language model is tuned offline on slides and publications by the speaker, either by reweighting available text corpora or by retrieving pertinent material on the Internet, similar publications or previous publications lectures by the same speaker.

Speech translation systems generally consist of two major components: speech recognition and machine translation. Available audio recordings are recognized and the resulting hypothesis transmitted to the machine translation, which outputs the translation Performing speech recognition on a stream of audio data is generally done on a per utterance level, whereas the utterance boundaries have to be determined with the help of an audio segmenter in front of the speech recognizer. When the audio data contains noise artifacts or cross-talk, this strategy can be useful because such phenomenon can be removed in advance, leading to an increase in ASR performance.

The techniques used in such audio segmenters often require a global optimization over the whole audio data and therefore may be infeasible for a simultaneous translation system. On the other hand, speech/non-speech based audio segmenters introduce an additional latency, because the classification of speech/non-speech frames has to be followed by a smoothing process to remove mis-classifications. Also, in the architecture of the speech recognizer itself, longer utterances often lead to a disproportional increase of the search space during decoding and therefore to longer decoding times.

Most machine translation systems were developed in the context of text translation and have to cope with all the differences between a source and target language such as different amount and usage of word ordering, morphology, composita, idioms, and writing style, but also vocabulary coverage. In addition to the differences between a source and target language, spoken language, i.e. speech, differs also in style. While text is mostly grammatically correct, spoken language and especially spontaneous or sloppy speech contains many ungrammaticalities such as hesitations, interruptions and repetitions. In addition, the choice of words and the amount of vocabulary used differ between text and speech. Another difference is that text is written and semantic boundaries are marked with punctuation while for speech, either humans or automatic speech recognition systems have to be used to transcribe the data. This introduces an additional source of error and, due to the ungrammaticalities of speech, semantic boundaries are difficult to identify. This is a problem because traditionally almost all machine translation systems are trained on bilingual sentences, so that the input should be also sentence-like segments, which may be a problem when a low latency speech translation system is required. To cope with this problem, a third component focusing on the resegmentation of the ASR hypothesis with the requirement of achieving a high translation quality together with a low latency is described herein according to various embodiments.

FIG. 1 illustrates a schematic overview of an embodiment of a simultaneous translation system 10 and its models. A speech recognition unit 12 produces partial hypotheses 14 based on an acoustic model 16, a language model 18 and a dictionary 20. The hypotheses 14 are merged, filtered and resegmented by a resegmentation unit 22 using a boundary model 24. The processed hypotheses are transferred to a machine translation unit 26 for translation into another language. Such translation units 26 are specified by using a translation model 28 and a language model 30 and/or dictionaries or grammars. In various embodiments, one of the systems 10 is used for each desired language.

Figure 2:
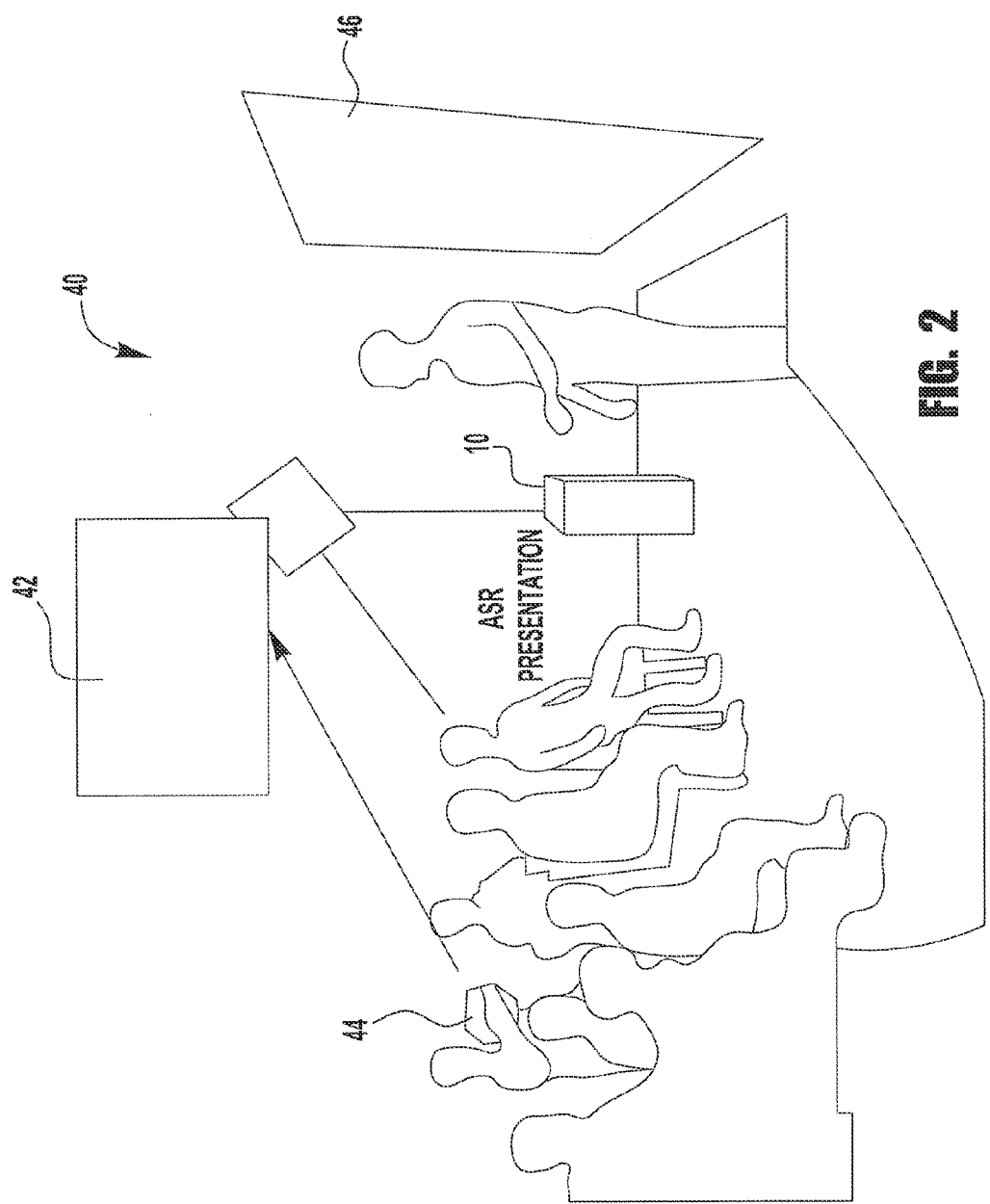
FIG. 2 illustrates an embodiment of a translation system having various output devices.

FIG. 2 illustrates an embodiment of a translation system 40 having various output devices. The system includes a targeted audio device 42, a heads up display unit (glasses or goggles) 44 and a monitor 46 that displays subtitled translations. When an attendee at a spoken presentation wears the heads tip display unit 44, text in the translated language is projected into the field of view of the attendee. In various embodiments, the targeted audio device 42 such as that described in D. Olszewski, F. Prasetyo, and K. Linhard, "Steerable Highly Directional Audio Beam Loudspeaker", in Proc. of the Interspeech, Lisboa, Portugal, September 2006. The targeted audio device is a beam-steered loudspeaker, consisting of several small ultrasound loud-speakers. The device outputs audio in a beam with a width of about 1-2 meters. People sitting within the beam are able to hear the synthesized translation output and people outside the beam do not. In various embodiments, several such targeted audio devices are assigned in various languages to accommodate each participant in the lecture room.

In various embodiments, the following output devices may be used:

Display Screens: Naturally, output can be delivered via traditional display technology: display on separate screens, or as subtitles; but it all add distraction and inconvenience and it limits output to one language.

Personalized headphones or PDA screens. This allows for individual choice of output language (if several are provided), but it is inconvenient to wear.

Translation goggles: Heads-up display goggles that display translations as captions in a pair of personalized goggles. Such a personalized visual output mode exploits the parallelism between acoustic and visual channels. This is particularly useful if listeners have partial knowledge of a speaker's language and wish to add complementary language assistance.

Targeted Audio Speakers: A set of ultra-sound speakers with high directional characteristics that provide a narrow audio beam to individual listeners in a small area of the audience, where simultaneous translation is required. Since such speakers are only audible in a narrow area, they do not disturb other listeners, and several speakers can provide different languages to different listeners.

Database: The translated speech may be output to a storage medium such as a database so that a user can browse, search, index, view, etc. the content and its translation at a later time.

In various embodiments, the techniques described in CHIL (Waibel et al., 2004), "Computers in the Human Interaction Loop", are used for speaker localization and tracking, speech activity detection and distant-talking automatic speech recognition, without any constraint on the number or distribution of microphones in the room nor on the number of sound sources active at the same time.

Various embodiments employ the techniques described in TC-STAR (TC-Star, 2004), "Technologies and Corpora for Speech-to-Speech-Translation", for Speech-to-Speech Translation (SST) for offline applications and for general topics of discussion (not simultaneous lectures), which is a combination of Automatic Speech Recognition (ASR), Spoken Language Translation (SLT) and Text to Speech (TTS).

Various embodiments use loose coupling, passing the first-best hypothesis from the recognizer to the translation component. Translation results may be reported using the evaluation metrics described in K. Papineni, S. Roukos, T. Ward, and W.-J. Zhu, "Bleu: a Method for Automatic Evaluation of Machine Translation". Technical Report RC22176 (WO 109-022), IBM Research Division, T. J. Watson Research Center, 2002 and NIST MT evaluation kit version 1 la, http//www.nist.gov/speech/tests/mt, 2004. In various embodiments, all machine translation (MT) scores are calculated using case-insensitive scoring and one reference translation per test set.

Various embodiments integrate the aforementioned speech recognition and machine translation systems together with a sentence segmentation component and a speech synthesis into a client-server framework (see C. Fiigen, M. Westphal, M. Schneider, T. Schultz, and A. Waibel, "LingWear A Mobile Tourist Information System", in Proc. of the Human Language Technology Conf. (HLT), San Diego, Calif., March, NIST, 2001).

Various embodiments use the Janus Recognition Toolkit (JRTk) featuring the Ibis decoder as described in H. Soltau, F. Metze, C. Fiigen, and A. Waibel, "A One Pass-Decoder Based on Polymorphic Linguistic Context Assignment", in ASRU, Trento, Italy, 2001. In various embodiments, the SRI Language Modeling Toolkit (SRILM) described in A. Stolcke, SRILM, "An Extensible Language Modeling Toolkit", in ICSLP, Denver, Colo., USA, 2002, is used for language modeling.

In various embodiments, to reach real-time end-to-end performance, the single pass speech recognizer is tuned to run faster than real-time by further restricting the beam search. In various embodiments, such an arrangement results in an increase in WER to about 13% on the evaluation talks but improves speed and reduces latency for simultaneous translation.

In various embodiments, to keep the latency of the system as short as possible the speech recognizer starts to decode while the speaker is talking and continuously returns partial back traces with first best hypotheses. Because the machine translation awaits complete sentences as input, the partial hypotheses are merged together and resegmented to sentence-like segments. Thus, no speech segmentation is performed before processing by the speech recognizer but is done afterwards so that the segmentation boundaries may be tuned with respect to optimal machine translation performance. In various embodiments, segmentation is done at silence regions only, whereby additional thresholds are defined to produce segments with a length of about, for example, five to ten words. Thus, the latency of the system may be limited to, for example, a maximum of about five seconds.

As described herein, for automatic speech recognition (ASR) and statistical machine translation (SMT) experiments on lectures using various embodiments of the present invention, three different lectures were selected as development and evaluation data. These lectures were held in non-native English by the same speaker on different topics and were recorded with close talking microphones as in C. Fügen, M. Kolss, D. Bernreuther, M. Paulik, S. Stüker, S. Vogel, and A. Waibel, "Open Domain Speech Recognition & Translation: Lectures and Speeches", in ICASSP, Toulouse, France, 2006.

Dev: This 24 min talk was held to give a broad overview of current research projects in a lab.

t035: A 35 min talk held as a conference key-note, which is only partly covered by the Dev talk.

t036+: A 31 min talk on the same topic as t035, but held in a different environment and situation.

"The Translanguage English Database TED", in ICSLP, volume LDC2002S04, Yokohama, September 1994), CHIL, seminars (see A. Waibel, H. Steusloff, and R. Stiefelhagen, "CHIL Computers in the Human Interaction Loop", in $5^{th}$ International Workshop on Image Analysis for Multimedia Interactive Services, Lisbon, April 2004, http://chil.server.de), and European Parliament Plenary Sessions (EPPS) (sec C. Gollan, M. Bisani, S. Kanthak, R. Schliitcr, and H. Ney, "Cross Domain Automatic Transcription on the TC-STAR EPPS Corpus", ICASSP 2005). Table 1 illustrates an overview of the total amount of speech in the different corpora.

TABLE 1

|          | ICSI | NIST | TED  | CHIL | EPPS |
|----------|------|------|------|------|------|
| Speakers | 463  | 77   | 52   | 67   | 1894 |
| Duration | 72 h | 13 h | 13 h | 10 h | 80 h |

For language model training, some additional text data was used on top of the language model training data of (see C. Fiigen, M. Wölfel, J. W. McDonough, S. Ikbal, F. Kraft, K. Laskowski, M. Ostendorf, S. Stiker, and K. Kumatani, "Advances in Lecture Recognition: The ISL, RT-06S Evaluation System", Interspeech 2006, Pittsburgh, Pa., USA, September 2006 and S. Stüker, C. Fügen, R. Hsiao, S. Ikbal, F. Kraft Q. Jin, M. Paulik, M. Raab, Y.-C. Tam, and M. Wöfel, "The ISL TC-STAR Spring 2006 ASR Evaluation Systems", in TC-Star Speech to Speech Translation Workshop, Barcelona, Spain, June 2006). Altogether, the following corpora were available: talks, text documents from TC-STAR and CHIL, EPPS transcripts, EPPS final text editions, non AMI meeting data (ISL, ICSI, NIST), AMI meeting data, TED lectures, CHIL seminars, broadcast news data, UN (United Nations) text data released by ELDA, recent proceedings data (2002-2005), web data from UWash (related to ISL, ICSI, and NIST meetings) and web data collected for RT-06S (related to CHIL seminars). Table 2 illustrates the amount of words available for each corpus. Empty cells indicate that the data was not useful for that domain.

TABLE 2

|       | Talks | Docs | eppsS | eppsT | nAMI | AMI  | TED  | CHIL | BN    | UN  | Proc | Uwash | wCHIL |
|-------|-------|------|-------|-------|------|------|------|------|-------|-----|------|-------|-------|
| Words | 93k   | 192k | 750k  | 33M   | 1.1M | 200k | 98k  | 45k  | 131M  | 42M | 23M  | 147M  | 146M  |
| EPPS  |       |      | 35%   | 54%   |      |      |      |      | 9%    | 2%  |      |       |       |
| CHIL  |       |      |       |       | 15%  | 8%   | 0.6% | 2.5% | 0.8%  |     | 24%  | 12%   | 15%   |
| Dev   | 36%   | 1%   |       | 12%   |      |      | 3%   |      | 8%    |     | 9%   | 11%   | 12%   |

In various embodiments, for ASR the seminar part of the NIST RT-06S development data and the 2006 EPPS development data are used as additional data sources. For acoustic model training, the following corpora are used: ICSI and NIST meeting recordings (see A. Janin, J. Ang, S. Bhagat, R. Dhillon, J. Edwards, M. Morgan, B. Peskin, E. Shriberg, A, Stolcke, C. Wooters, and B. Wrede, "The ICSI Meeting Project: Resources and Research", in Proc. Of the ICASSP Meeting Recognition Workshop, Montreal, Canada, May 2004, NIST and Linguistic Data Consortium (LDC), ICSI, ISL and NIST Meeting Speech Corpora at LDC http://www.ldc.upenn.edu catalog IDs LDC2004S02, LDC2004S05, LDC2004S09, 2004), TED lectures (see L. F. Lamel, F. Schiel, A. Fourcin, J. Mariani, and H. Tillmaim, The acoustic models described hereinbelow were all trained in the same way resulting in a size of 16,000 distributions over 4,000 models, with a maximum of 64 Gaussians per model. These models are all based on the same quint-phone context decision tree and phoneme set that was used for the RT-06S evaluation system. Furthermore, the acoustic model training setup was taken from the RT-06S system: a first incremental growing of Gaussians; estimation of the global STC transform as in M. J. F. Gales, "Semi-tied covariance matrices" in ICASSP 1998 and a second incremental growing of Gaussians. To train the distributions for the semi-continuous system and to compensate for the occasionally worse fixed-state alignments, two iterations of Viterbi training were performed. For the SAT models, four additional iterations of SAT Viterbi training by using constrained MLLR in the feature space (FSA) as in M. J. F. Gales, "Maximum Likelihood Linear Transformations for HMM-based Speech Recognition" Technical report, Cambridge University, Cambridge, United Kingdom, 1997 were applied. An MFCC FFT front-end with a 42-dimensional feature space after linear discriminant analysis (LDA) and a global STC transform with utterance-based cepstral mean subtraction (CMS) were used.

In various embodiments, a single acoustic model is used for both domains, EPPS and CHIL seminars and the acoustic model is used on the lecture data. Different acoustic models trained on different subsets of the acoustic training material described hereinabove were compared.

A three pass decoding setup is used in various embodiments. The first pass uses incremental speaker-based vocal tract length normalization (VTLN) and constrained MLLR estimation and is decoded with semi-continuous models using tight search beams. The second pass uses the same semi-continuous acoustic models as pass one, but before decoding, MLLR (see C. J. Leggetter and P. C. Woodland, "Maximum Likelihood Linear Regression for Speaker Adaptation of Continuous Density Hidden Markov Models", Computer Speech and Language, 9:171185, 1995) adaptation together with an estimation of fixed VTLN and constrained MLLR parameters is performed. For this, the confidence weighted hypotheses of the previous pass are used. For the third pass, the FSA-SAT acoustic models are used together with the same adaptation scheme applied in pass two. After that, confusion network combination (CNC) (see L. Mangu, E. Brill, and A. Stolcke, "Finding Consensus among Words: Lattice-based Word Error Minimization", in EUROSPEECH, 1999) is performed using the lattices of the third pass only. The same decoding dictionaries and language models are used as for the EPPS and RT-06S evaluation systems.

In various embodiments, for the CHIL seminars the same language models and dictionaries as described in C. Fügen. M. Wöfel, J. W. McDonough, S. Tkbal, F. Kraft, K. Laskowski, M. Ostendorf, S. Stüker, and K. Kumatani, "Advances in Lecture Recognition: The ISL RT-06S Evaluation System", Interspeech 2006, Pittsburgh, Pa., USA, September 2006, are used. The 4-gram language model was trained on AMI and non-AMI meetings, TED, CHIL, data, BN, proceedings and web data related to meetings and CHIL, lectures. The interpolation weights, which were tuned on held-out CHIL, data are shown in Table 2. In one embodiment, the language model has a perplexity of 130 on the RT-06S development data, while 16% 4-grams, 41% 3-grams, 39% 2-grams, and 4% 1-grams are used. The dictionary consists of around 59 k pronunciation variants over a vocabulary of 52 k. It has an OOV-Rate of 0.65 on the RT-06S development data.

As can be seen in Table 3, acoustic models trained on EPPS alone or additionally including TED are significant worse than the other two systems. The performance of the two other systems is nearly identical, which means that adding the EPPS data to the acoustic model training data used in RT-06 (ICSI+NIST+TED) does not hurt (but also does not improve the overall results).

TABLE 3

| CHIL | $1^{ST}$ | $2^{ND}$ | $3^{RD}$ | cnc |
|---|---|---|---|---|
| EPPS | 40.3 | .— | .— | .— |
| TED + EPPS | 38.7 | .— | .— | .— |

TABLE 3-continued

| CHIL | $1^{ST}$ | $2^{ND}$ | $3^{RD}$ | cnc |
|---|---|---|---|---|
| ICSI + NIST + TED + EPPS | 34.1 | 27.5 | 26.2 | 25.5 |
| ICSI + NIST + TED | 34.0 | 27.1 | 26.0 | 25.5 |

For the European Parliament Plenary Sessions, the language models and dictionaries as described in Stuker et al. are used. In one embodiment, the 4-gram language model was trained on EPPS transcriptions and final text editions, BN, and UN and reached a perplexity of 93 on the 2006 EPPS development data, whereas 29% 4-grams, 36% 3-grams, 32% 2-grams, and 4% 1-grams were used. The interpolation weights were tuned on the 2005 EPPS development data and are shown in Table 2. The dictionary for EPPS consists of 45 k pronunciations over a vocabulary of 40 k and has an OOV-Rate of 0.43 on the 2006 EPPS development data.

As can be seen in Table 4 the last system trained without EPPS performs worst Furthermore, compared to the acoustic model used for the 2006 EPPS evaluation (MS23, Stuker et al.), the acoustic model training setup developed for RT-06S is significantly better (MS23 vs. EPPS rows). An additional gain can be seen by adding TED, which is also a corpus containing European English. By adding the meeting data, the system improves not further, instead it is in between the EPPS and TED+EPPS systems. Nevertheless, after doing confusion network combination, it performs identical to the TED+EPPS system.

TABLE 4

| | $1^{ST}$ | $2^{ND}$ | $3^{RD}$ | cnc |
|---|---|---|---|---|
| MS23 | 22.6 | .— | .— | .— |
| EPPS | 20.8 | 15.4 | 14.7 | 14.5 |
| TED + EPPS | 20.1 | 14.8 | 14.3 | 14.1 |
| ICSI + NIST + TED + EPPS | 20.6 | 15.1 | 14.6 | 14.1 |
| ICSI + NIST + TED | 29.1 | .— | .— | .— |

Compared to the CHIL, seminars, the EPPS results compare favorably because of the available amount of acoustic and language model in-domain training data for EPPS compared to CHIL, where only a very small amount of in-domain data is available. Furthermore, the language used in the European Parliament is more formal and therefore less spontaneous. This leads also to a better OOV-rate and language model perplexity with a higher n-gram coverage for larger n-grams.

Based on the perplexities and OOV-Rates on Dev shown in Table 5 the language model and dictionary built for the CHIL seminars was selected for the baseline experiments. This selection holds also for the evaluation talks. The EPPS language model and vocabulary may be, due to the large amount of in-domain data, too specific. The OOV-rates of the RT-06S (CHIL) vocabulary and for t036+ are low because the talk is not very specific.

TABLE 5

| | Dev | | t035 | | t036+ | |
|---|---|---|---|---|---|---|
| | PPL | OOV | PPL | OOV | PPL | OOV |
| CHIL | 173 | 0.22 | 117 | 0.27 | 186 | 0.09 |
| EPPS | 205 | 1.29 | 230 | 1.83 | 229 | 1.72 |

As can be seen in Table 6, the acoustic model trained on all data performs significantly better than the other models. Thus, this model is used in various embodiments. The baseline results on the lecture evaluation talks are shown in Table 7. With the training setup developed for RT-06S the results improved compared to the acoustic models developed in Fügen and Kolss et al. (MS11 column in Table 7). Furthermore, it can be seen that the system performs well on unseen domains (t035) and different environments (t036+).

TABLE 6

|  | $1^{ST}$ | $2^{ND}$ | $3^{RD}$ | cnc |
|---|---|---|---|---|
| EPPS | 23.9 | .— | .— | .— |
| TED + EPPS | 23.4 | .— | .— | .— |
| ICSI + NIST + TED + EPPS | 21.4 | 16.2 | 15.0 | 15.5 |
| ICSI + NIST + TED | 24.3 | .— | .— | .— |

TABLE 7

|  | $1^{ST}$ | $2^{ND}$ | $3^{RD}$ | cnc | MS11 |
|---|---|---|---|---|---|
| t035 | 17.3 | 12.6 | 12.1 | 12.2 | 12.7 |
| t036+ | 16.7 | 12.0 | 11.6 | 11.5 | 12.4 |

Lectures are often suitable domains for doing adaptation, because the lecturer and also the topic might be known in advance. Therefore, acoustic and language model adaptation results are given herein below. As can be seen, this allows reduction of the decoding setup from three to only a single decoding pass without any loss in WER.

For acoustic model adaptation an additional amount of around 7 hours of speech for the same speaker was available. For adaptation, subsets of this data with different durations were used to compute VTLN and constrained MLLR (FSA) parameters and to perform model based MLLR adaptation. The results can be seen in Table 8. While the adaptation works well on the evaluation talks, the 7his results are similar to those achieved after CNC with the baseline systems—the results on the Dev talk are worse. This is due to a large channel mismatch between the adaptation material and the Dev talk. To confirm this, the particular talk itself was adapted and reached for all talks reasonable results (see column sup in Table 8). It can also be seen that doubling the adaptation data results in a relative gain of around 0.5% in WER. For language model adaptation a first experiment was performed by turning the interpolation weights and reselecting the different corpora with respect to the lecture domain. The interpolation weights, tuned on some held-out data and the selected corpora can be seen in Table 2. Thus, the perplexity on the Dev talk could only be reduced from 17.3 to 168. Nevertheless there are gains in WER on all lectures, which are reported in Table 9.

TABLE 8

|  | 0.5 hrs | 1.5 hrs | 3.5 hrs | 7 hrs | Sup |
|---|---|---|---|---|---|
| Dev | 20.9 | 20.0 | 19.5 | 18.9 | 12.0 |
| t035 | 14.2 | 13.1 | 12.6 | 12.1 | 10.1 |
| t036+ | 13.3 | 12.3 | 11.5 | 10.7 | 9.3 |

TABLE 9

|  | Unadapted | Adapted | PPL |
|---|---|---|---|
| Dev | 18.9 | 16.1 | 168 |
| t035 | 12.1 | 10.5 | 165 |
| t036+ | 10.7 | 9.1 | 193 |

To find a translation for a source phrase in various embodiments the general word alignment is restricted. Words inside the source phrase align to words inside the target phrase, and words outside the source phrase align outside the target phrase. The constrained alignment probability is calculated using the IBM1 word alignment model, but the summation of the target words is restricted to the appropriate regions in the target sentence. Also, the position alignment probabilities are adjusted accordingly using Vogel. Optimization is over the target side boundaries $i_1$ and $i_2$.

$$p_{i_1,i_2}(f \mid e) = \prod_{j=1}^{j_i-1} \sum_{i \notin (i_1...i_2)} \frac{1}{I-k} p(f_j \mid e_i) \times$$

$$\prod_{j=j_1}^{j_1} \sum_{i=i_1}^{i_2} \frac{1}{k} p(f_j \mid e_j) \times \prod_{j=j_2+1}^{J} \sum_{i \notin (i_1...i_2)} \frac{1}{I-k} p(f_j \mid e_i)$$

Similar to $p_{i1,i2}(f|e)$ then $p_{i1,i2}(e|f)$ can be calculated, now summing over the source words and multiplying along the target words. To find the optimal target phrase the log probabilities are interpolated and the pair $(i_1,i_2)$ that gives the highest probability is used. The interpolation factor c can be estimated on a development test set. The scores calculated in the phrase alignment are alignment scores for the entire sentence. As phrase translation probabilities the second term in Equation 1 is used.

The beam search decoder combines all model scores to find the best translation. In such embodiments, the different models used were: (1) the translation model, i.e. the word-to-word and phrase-to-phrase translations extracted from the bilingual corpus according to the new alignment method described herein; (2) a trigram language model—the SRI language model toolkit was used to train the models. (3) A word reordering model, which assigns higher costs to longer distance reordering. The jump probabilities p(j|j') of the HMM word alignment model where j is the current position in the source sentence and j is the previous position was used. (4) Simple word and phrase count models. The former is essentially used to compensate for the tendency of the language model to prefer shorter translations, while the latter can be used to give preference to longer phrases. For each model a scaling factor can be used to modify the contribution of this model to the overall score.

The decoding process is organized into two stages: First, the word-to-word and phrase-to-phrase translations and, if available, other specific information such as named entity translation tables are inserted into a translation lattice. In the second step, the best combinations of the partial translations are found, such that every word in the source sentence is covered exactly once. This amounts to doing a best path search through the translation lattice, which is extended to allow for word reordering: Decoding proceeds essentially along the source sentence. At each step, however, the next word or phrase to be translated may be selected from all words laying or phrases starting within a given look-ahead window from the current position.

For training the baseline translation systems, the parallel EPPS corpus was used. For English-Spanish, a version was created by RWTH Aachen within TC-STAR (see Gollan et al.). The English-to-German models were trained on the EPPS data as provided in P. Koehn, "Europarl: A Multilingual Corpus for Evaluation of Machine Translation", http://people.csail.mit.edu/koehn/publications/europarl, 2003. In addition, a small number of lectures similar in style to development and evaluation data was collected, transcribed, and translated into Spanish and German. Altogether, parallel lecture corpora of about 12,000 words were available in each language.

Adapting the MT component of the EPPS translation system towards the more conversational style of lectures was accomplished by a higher weighting of the available lecture data in two different ways. First, for computing the translation models, the small lecture corpora were multiplied several times and added to the original EPPS training data.

Second, for (target) language model computation, a small tri-gram LM was computed on t035 and then interpolated with the original EPPS language model, whereas the interpolation weight was chosen in order to minimize the perplexity on the development set. In this manner the perplexity on the Dev talk could be reduced from 645 to 394 for German and from 543 to 403 for Spanish. To further adapt the target language models, Spanish and German web data was collected with the help of tools provided by the University of Washington (see University of Washington, web data collection scripts http://ssli.ee.washington.edu/projects/ears/WebData/web data collection.html, 2006). A small amount of the used search queries were handwritten, however, most search queries were automatically created by using the most frequent tri-grams found in the Dev talk. Approximately ¼ of all development set ti-grams were used for this. The German and Spanish web corpora collected in this manner consisted out of 175M words and 120M words, respectively. The web corpora were again added to the existing LMs by interpolation, which yielded a perplexity of 200 for German and 134 for Spanish. The corresponding perplexities on the t0.36+ talks are 617 and 227, respectively. The effects of translation model and language model adaptation, as well as the results of the final system, combining both adaptation steps, are shown in Tables 10 and 11 for English-to-Spanish and English-to-German, respectively. An element of better performance is to take advantage of smaller amounts of lecture data and other text and presentation data in order to improve the language model adaptation.

TABLE 10

Results on manual transcripts are shown in parenthesis

| System | NIST | Bleu |
|---|---|---|
| Baseline (EPPS) | 4.71 (5.61) | 15.41 (20.54) |
| TM-adaptation | 4.78 (5.67) | 16.05 (21.43) |
| LM-adaptation | 5.10 (5.99) | 17.58 (22.90) |
| Final system | 5.22 (6.11) | 18.57 (24.00) |

TABLE 11

Results on manual transcripts are shown in parenthesis

| System | NIST | Bleu |
|---|---|---|
| Baseline (EPPS) | 4.00 (4.71) | 9.32 (12.53) |
| TM-adaptation | 4.29 (5.06) | 11.01 (14.95) |
| LM-adaptation | 4.37 (5.12) | 11.67 (14.96) |
| Final system | 4.67 (5.47) | 13.22 (17.25) |

Figure 3:
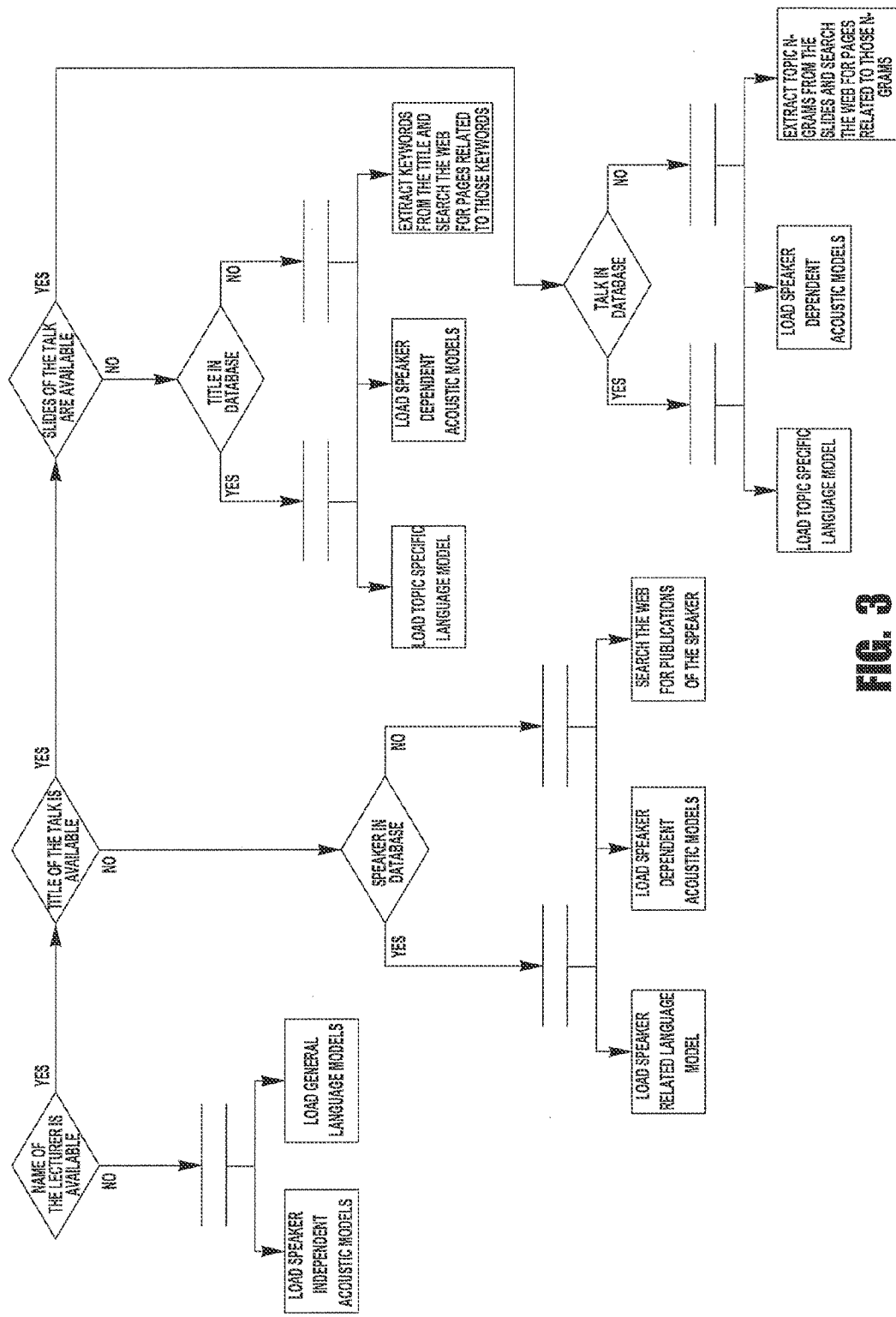
FIG. 3 illustrates an open domain process according to an embodiment of the present invention.

FIG. 3 illustrates an open domain process according to an embodiment of the present invention. As can be seen in FIG. 3 several actions may be performed by the lecture translation system in advance to a lecture. If neither the lecturer nor the title or topic of a lecture is known in advance as determined at startup time, the system loads general speaker independent acoustic, language, and translation models. Since no further information is given, the system is also not able to adapt its models any further. If only the name of the speaker is known and the speaker has already given a talk, on which the system has adapted its models and stored in the lecturer database, the system is now able to load speaker adapted acoustic models. Since the topic is unknown it has to load general or at most slightly adapted language and translation models. If there is no information about the speaker stored in the database, speaker independent models has to be loaded. In both cases the information about the speaker can be used to query the internet for previous lectures or other publications by the same speaker to adapt the language and translation models.

If also the title or even the slides of the talk are available in advance, this information can be used to search the Internet for even more specific material, which can be related to the speaker but also to the topic. Therefore, topic related keywords or n-grams are extracted from the title or slides. Thus, the more information about a speaker that is shown in advance, the better the models can be adapted and the better the system will perform in the end. For performing the adaptation, the material collected from the Internet has first to be filtered and normalized in order to interpolate it with the other more general background models.

Figure 4:
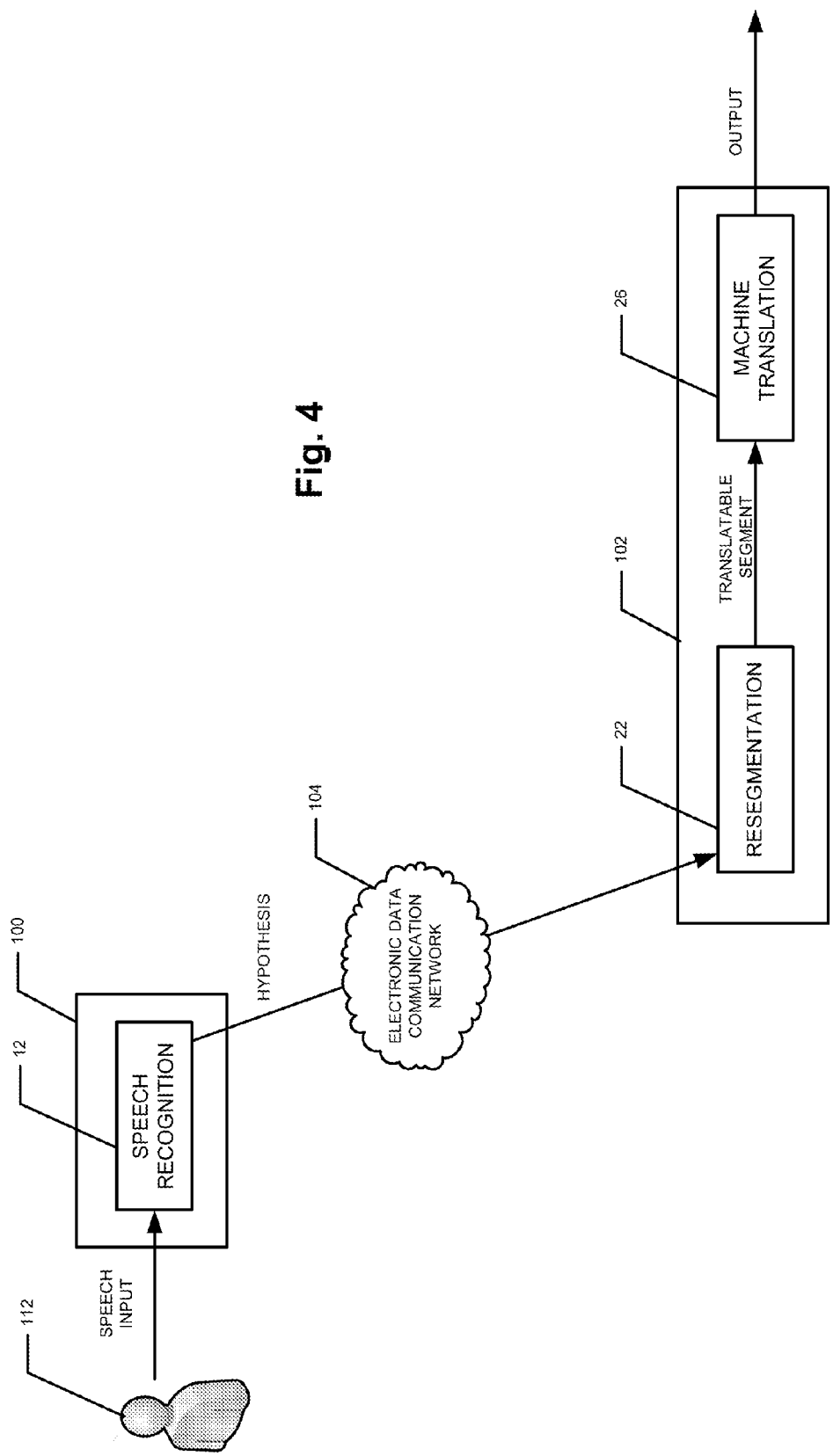
FIGS. 4-10 illustrate speech translation systems according to other various embodiments of the present invention.

The speech translation system 10 of FIG. 1 may be implemented in a microprocessor-based device, such as a server, desktop or personal computer, laptop, workstation, main frame computer, supercomputer, table computer, smart phone, etc., and combinations (online and/or offline) thereof. Such a microprocessor-based device may comprise one or more microprocessors and associated memory (e.g., primary memory, such as RAM and ROM, and/or secondary memory, such as magnetic hard disk drives and optical storage devices). The speech recognition unit 12, the resegmentation unit 22, and the machine translation unit 26 may have associated software modules stored in the memory (primary or secondary) that is executed by the microprocessor(s). In other embodiments, the speech translation system 10 may be implemented with separate microprocessor-based devices. For example, as shown in FIG. 4, the speech recognition unit 12 could be implemented with a first microprocessor-based device 100 that is in communication with a second microprocessor-based device 102 that implements the resegmentation unit 22 and the machine translation unit 26. The first and second microprocessor-based devices could be in communication via an electronic data communication network 104, such as the Internet, a LAN, WAN, a TCP/IP network(s), the Internet, or any other suitable electronic data communication network. The output from the machine translation unit 26 may be output via the electronic data communication network 104. In other embodiments, the resegmentation unit 22 could be on a separate microprocessor-based device that the machine translation unit 26. Also, the resegmentation unit 22 could be part of the first microprocessor-based device 100. Such multi-microprocessor-based systems could be used, for example, to translate a presentation presented through a video conference.

Figure 5:
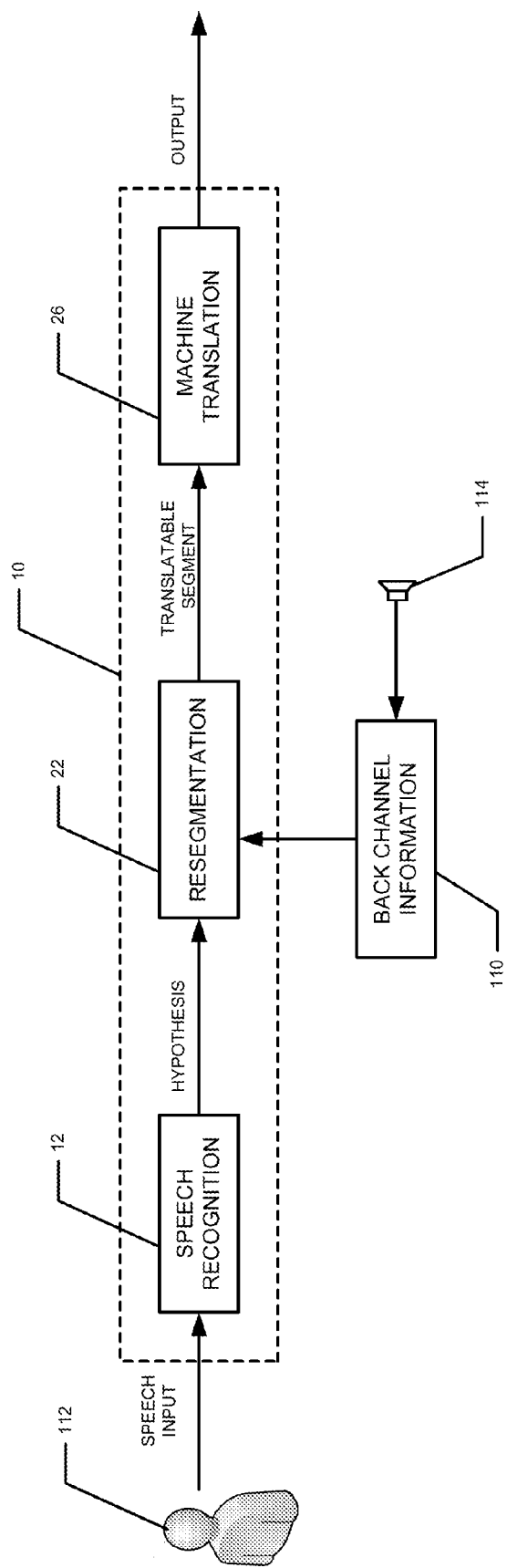

As shown in FIG. 5, according to various embodiments, the resegmentation unit 22 may use back channel information 110 to aid in determining the segments for translation. The back channel information could be, for example, audible input from another speaker, listener or audience members. For example, common audible feedback cues from a listener such as "un-huh" or "yes" could be used by the resegmentation unit 22 as a boundary for a segment in the presentation by the speaker 112. For example, the resegmentation unit 22 can be programmed to assume that such back channel information from the listener(s) marks the end of a translatable segment by the speaker, e.g., the end of the sentence. That is, for example, a "yes" from the listener indicates that the speaker has concluded a sentence or phrase of the presentation, which sentence or phrase can be the translatable segment.

Figure 6:
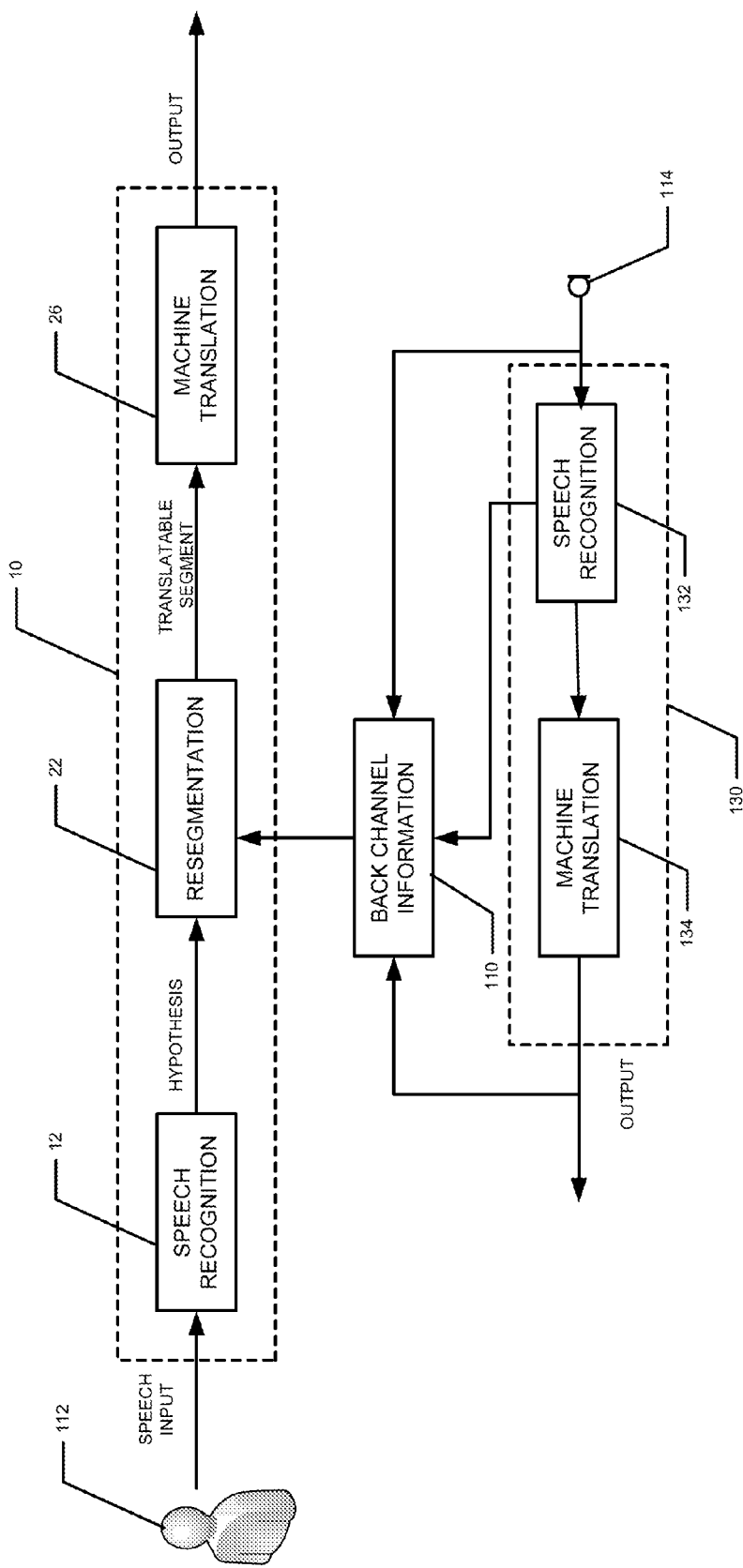

Also, for example, applause, booing or other crowd noise from an audience could be used as the back channel information by the resegmentation unit 22. Such sounds (e.g., utterances or crowd noise) could be picked up by a microphone 114 that picks up the sounds from the listener(s) that are used as the back channel information. In certain embodiments, such as shown in the example of FIG. 6, the back channel information 110 could be recognized speech from a speech recognition unit 132 of a second speech translation system 130 and/or translated speech from a machine translation unit 135 of the second speech translation system 130. The resegmentation unit 22 could be programmed to use certain recognized and/or translated utterances as back channel information for determining boundaries in the presentation of the speaker 112.

Figure 7:
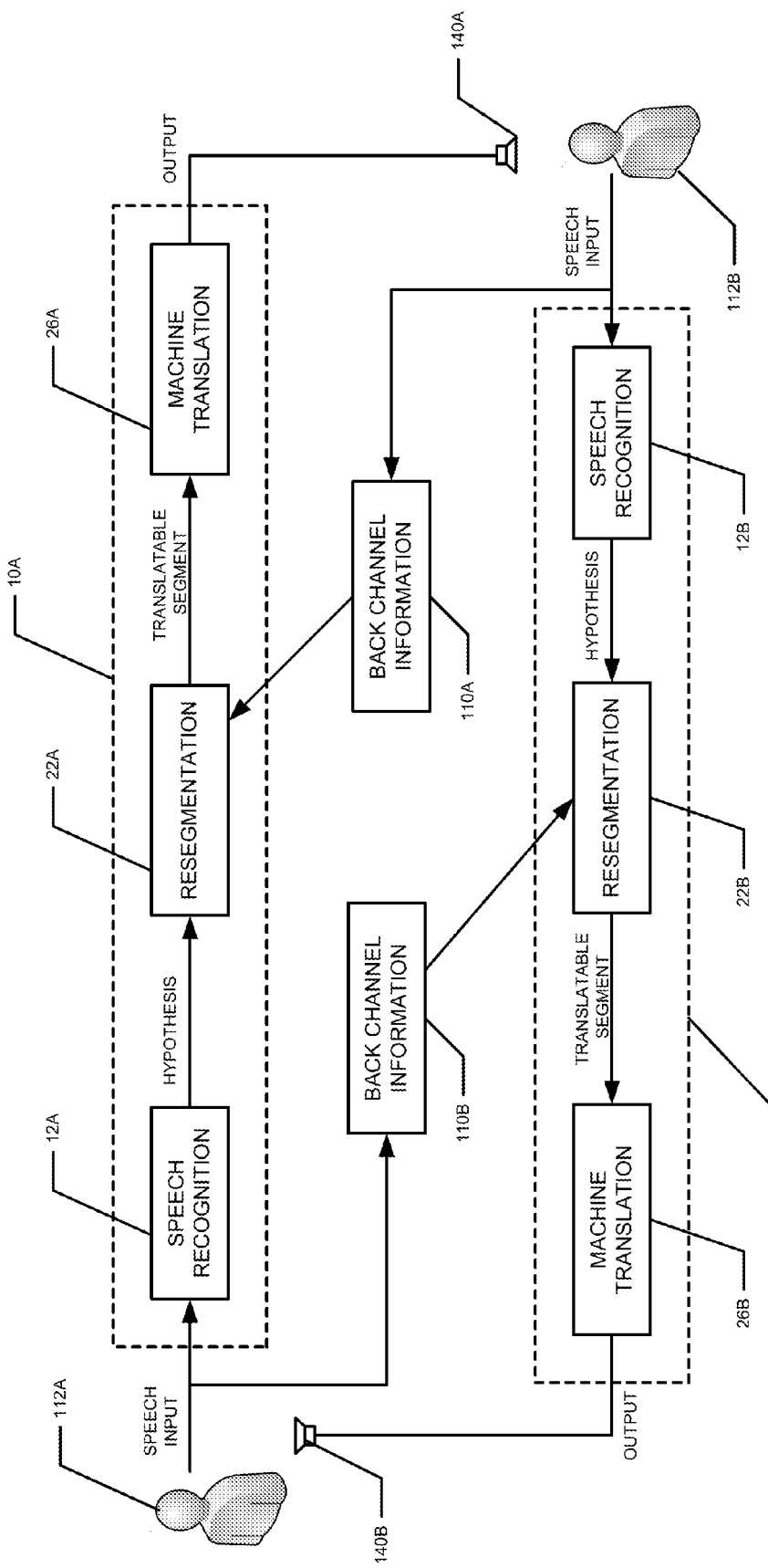

In addition, as shown in the example of FIG. 7, back channel information 110A, 110B could be used to segment a discussion between two (or more) speakers 120A, 120B using separate speech translation systems 10A, 10B, with separate speech recognition units 12A, 12B, separate segmentation units 22A, 22B, and separate machine translation units 26A, 26B. The detected speech (or other sounds) from each speaker 120B, 120A may be input to the resegmentation unit 22A, 22B of the other speaker's speech translation system 10A, 10B in order to define the boundaries. For simplicity, only the detected speech/speech from the other speaker is shown being input to the resegmentation units 22A, 22B in FIG. 7, although in other embodiments, as described above, the recognized and/or translated speech could be used as the input to the resegmentation units 22A, 22B. The output of the speech translation systems 10A, 10B may be played for the corresponding speaker/listener via speakers 140A, 140B. The speakers 140A, 140B may be connected to their corresponding speech translation systems 10A, 10B via an electronic data communication network.

In other embodiments, other information, in addition to or in lieu of the back channel information 110, may be used by the resegmentation unit 22 to segment the speech/presentation. Such other information may include, for example, pauses, prosodic cues, and/or language modeling. For example, the resegmentation unit 22 may construe a pause in the presentation as marking the end of a sentence by the speaker. Similarly, the resegmentation unit 22 may construe certain prosodic cues, such as pitch, loudness and/or duration commonly associated with the end of a sentence, as marking the end of a sentence by the speaker. Similarly, the resegmentation unit 22 may construe certain phraseology (language modeling) as marking the end of a sentence, such as "right?" or "you know," or other phrases that speakers commonly use to mark the end of a sentence. In such embodiments, the resegmentation unit 22 can be trained with training data in order to detect such cues indicative of the end of a sentence.

Moreover, the resegmentation unit 22 may use multiple cues to have greater confidence in marking the end of a sentence for segmentation. For example, the resegmentation unit 22 may have greater confidence that a sentence or spoken phrase is complete when both end-of-sentence wording and back channel information indicative of an end of a sentence are detected. Further, if prosodic cues from the speaker that are indicative of an end of sentence are also detected, the resegmentation unit 22 could be programmed to treat this combination as providing high confidence in marking the end of a sentence. The resegmentation unit 22 may therefore have more confidence that the speaker's sentence or phrase are complete—and hence suitable for segmentation—when multiple end-of-sentence cues are detected, such as the aforementioned back channel information, end-of-sentence wording, prosodic cues, etc.

Figure 8:
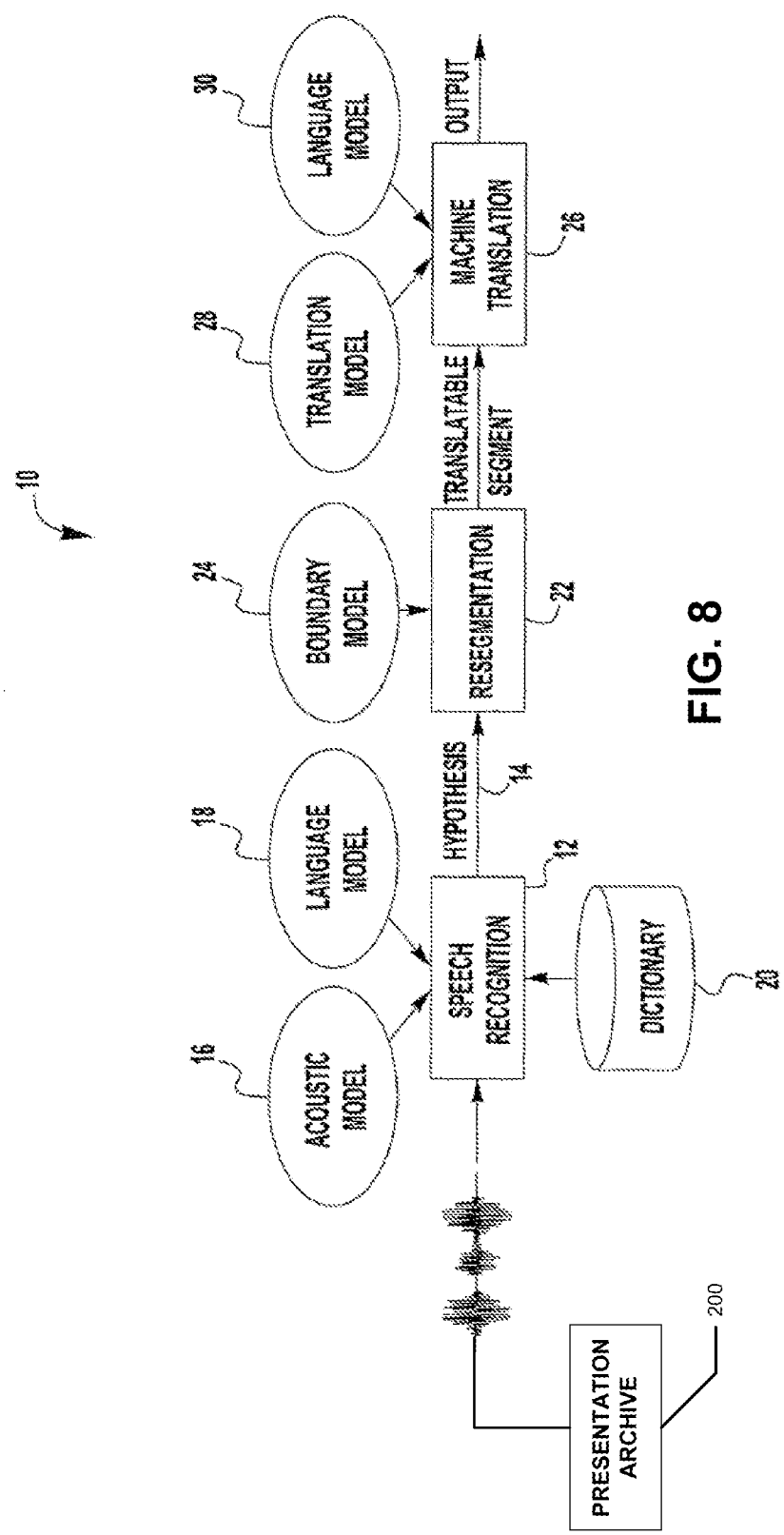

Although the various embodiments described above were described in the context of a real-time presentation, aspects of the present invention may also be used for archived presentations. For example, as shown in FIG. 8, an archived spoken presentation or other open domain speech may be stored in a presentation archive 200. The archive 200 may be implemented as a database using suitable primary or secondary computer data storage. The archive presentations could be, for example, recorded lectures or speeches, broadcasts, audio recordings, etc. In that way, the speech translation system 10 may translate previously recorded presentations.

Figure 9:
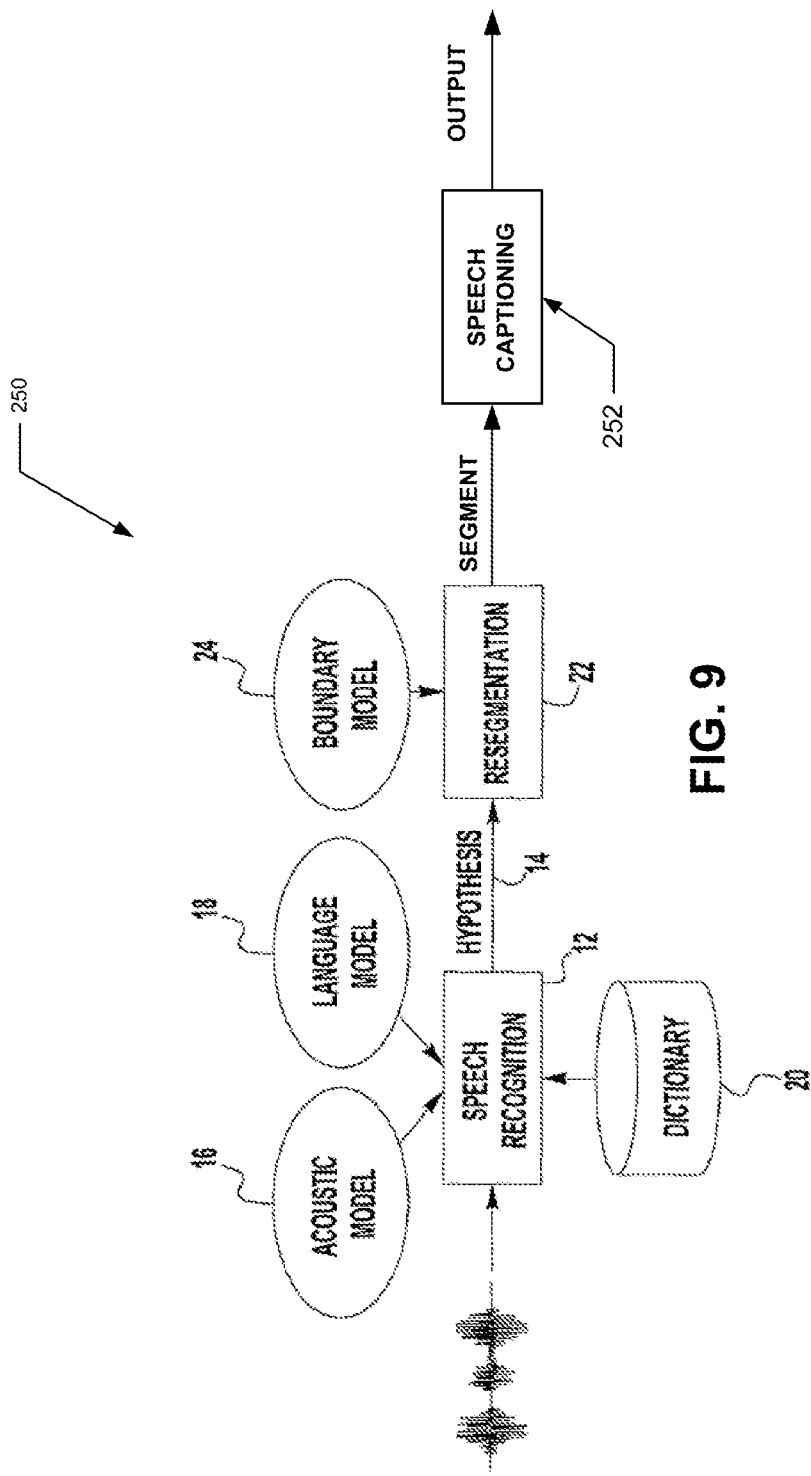
Figure 10:
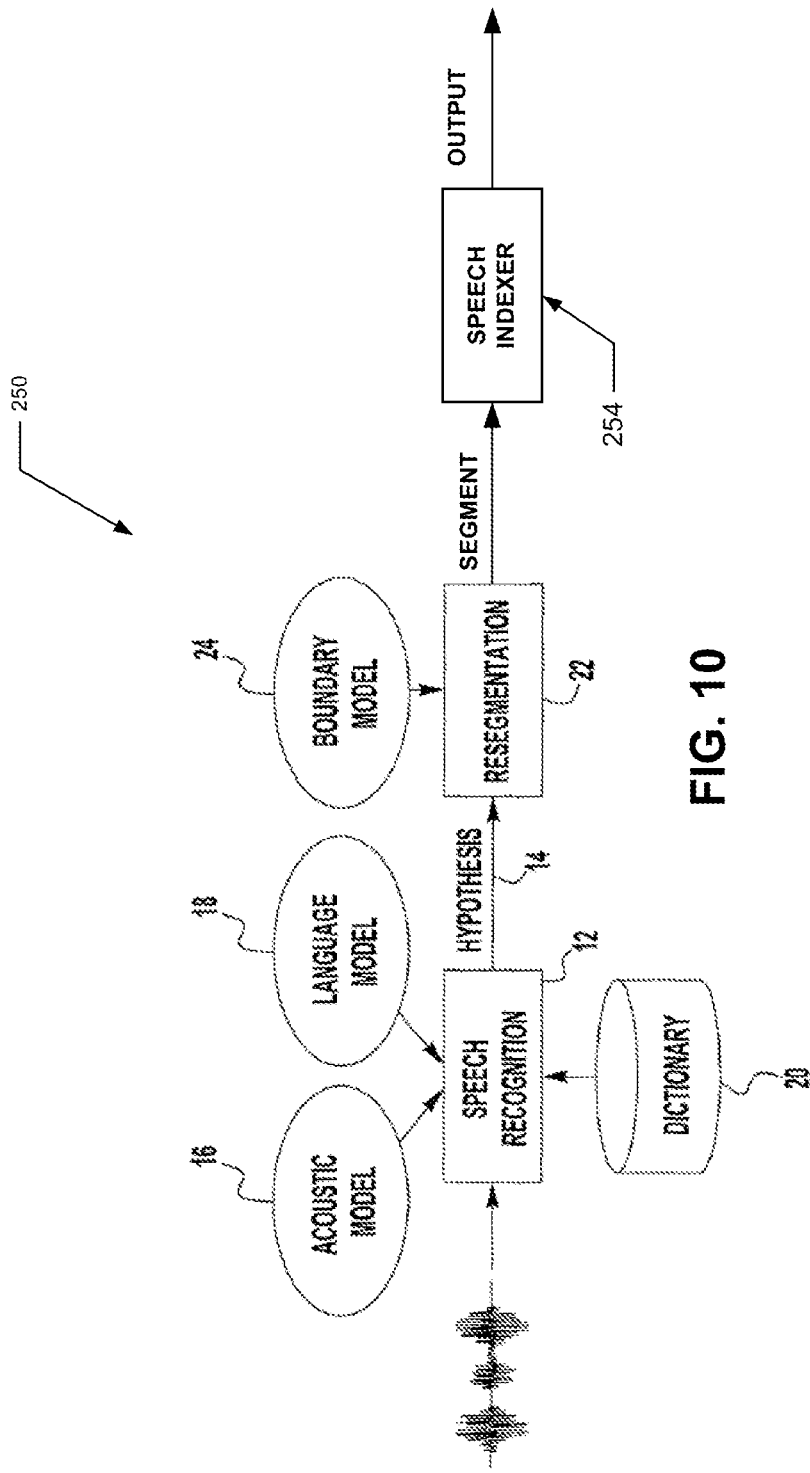

In other embodiments, rather than language translation, the present invention is direction to a system 250 for captioning or indexing a presentation, as shown in FIGS. 9 and 10. As shown in the examples of FIGS. 9 and 10, the speech recognition unit 12 generates the partial hypothesis for the input speech (whether real-time or archived), and the resegmentation unit 22 merges the hypothesis in a segment. However, instead of (or in addition to) being translated into a different language, the segment may be input to a speech captioning unit 252 (FIG. 9) or a speech index unit 254 (FIG. 10). The speech captioning unit 252 may generate captions for the speech to be used with, for example, video of the speech. The speech index unit 254 may create an index for the speech. Such speech captioning and indexer units are known in the art.

According to various embodiments, the present invention is directed speech translation systems and methods for simultaneously translating speech between first and second speakers, wherein the first speaker speaks in a first language and the second speaker speaks in a second language that is different from the first language. The speech translation system may comprise (i) a first-language automatic speech recognition unit, (ii) a first-language resegmentation unit in communication with the first-language automatic speech recognition unit, and (iii) a first-language machine translation unit in communication with the first-language resegmentation unit. The first-language automatic speech recognition unit may be configured for accepting spoken sound from the first speaker in the first language to the second speaker and for continuously creating a plurality of partial hypotheses in the first language of the spoken sound of the first speaker in real time while the first speaker is speaking. The first-language resegmentation unit may be configured to: (a) merge at least two partial hypotheses received from the first-language automatic speech recognition unit; and (b) resegment the merged partial hypotheses into a first-language translatable segment in the first language, wherein a segment boundary for the first-language translatable segment is determined based on sound from the second speaker. The first-language machine translation unit receives the first-language translatable segment in the first language from the first-language resegmentation unit, and outputs a translation of the spoken sound from the first speaker into the second language based on the received first-language translatable segment.

According to various implementations, the speech translation system may also comprise: (iv) a second-language automatic speech recognition unit, (v) a second-language resegmentation unit in communication with the second-language automatic speech recognition unit, and (vi) a second-language machine translation unit in communication with the second-language resegmentation unit. The second-language automatic speech recognition unit accepts spoken sound from the second speaker in the second language to the first speaker and continuously creates a plurality of partial hypotheses in the second language of the spoken sound of the second speaker in real time while the second speaker is speaking in a conversation with the first speaker. The second-language resegmentation unit: (a) merges at least two partial hypotheses received from the second-language automatic speech recognition unit; and (b) resegments the merged partial hypotheses into a second-language translatable segment in the second language, wherein a segment boundary for the second-language translatable segment is determined based on sound from the second speaker. The second-language machine translation unit receives the second-language translatable segment in the second language from the second-language resegmentation unit, and outputs a translation of the spoken sound from the second speaker into the first language based on the received second-language translatable segment.

The speech translation system may also further comprise: (i) a first microphone for picking up sound from the first speaker, and wherein output from the first microphone is input to the second-language resegmentation unit; and (ii) a second microphone for picking up sound from the second speaker, and wherein output from the second microphone is input to the first-language resegmentation unit. The first microphone may be in communication with the second-language resegmentation unit via an electronic data communication network, and similarly the second microphone may be in communication with the first-language resegmentation unit via the electronic data communication network.

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents, or improvements therein are still within the scope of the invention as defined in the appended claims. Also, the examples and experimental results illustrated herein arc exemplary and are not intended to limit the scope of the embodiments of the invention.

The invention claimed is:

1. A system comprising:
    an automatic speech recognition unit configured for determining spoken sound from a first speaker in a first language and for creating a plurality of partial hypotheses of the spoken sound of the first speaker;
    a resegmentation unit in communication with the automatic speech recognition unit,
        wherein the resegmentation unit is configured to:
            merge at least two of the partial hypotheses received from the automatic speech recognition unit;
            receive back channel information from one or more listeners, the one or more listeners different than the first speaker;
            determine a segment boundary for a translatable segment based on the received back channel information; and
            resegment the merged partial hypotheses into the translatable segment in the first language based on the determined segment boundary; and
    a machine translation unit, in communication with the resegmentation unit, that receives the translatable segment in the first language from the resegmentation unit, wherein the machine translation unit outputs a translation of the spoken sound from the first speaker into a second language based on the received translatable segment.

2. The system of claim 1, further comprising:
    a speech captioning unit, in communication with the resegmentation unit, that receives the translatable segment in the first language from the resegmentation unit, wherein the speech captioning unit outputs a caption of the spoken sound from the first speaker in the first language based on the received translatable segment.

3. The system of claim 1, further comprising:
    a speech index unit, in communication with the resegmentation unit, that receives the translatable segment in the first language from the resegmentation unit, wherein the speech index unit outputs an index of the spoken sound from the first speaker in the first language based on the received translatable segment.

4. The system of claim 1, wherein the resegmentation unit being configured to determine a segment boundary for a translatable segment based on the received back channel information comprises:
    retrieving a presentation from an archive, the presentation given by at least the first speaker; and
    detecting the spoken sound from the first speaker in the first language in the retrieved presentation.

5. The speech translation system of claim 1, wherein the back channel information is a sound from a crowd.

6. The speech translation system of claim 1, wherein the back channel information is a pause.

7. The speech translation system of claim 1, wherein the back channel information is a prosodic cue.

8. The speech translation system of claim 1, wherein the segment boundary for the translatable segment is determined based on an additional indicator in addition to the back channel information.

9. The speech translation system of claim 8, wherein the additional indicator is end-of-sentence wording.

10. A computer-implemented method comprising:
    determining, by an automatic speech recognition unit, spoken sound from a first speaker in a first language;
    creating a plurality of partial hypotheses of the spoken sound of the first speaker;
    merging, by a resegmentation unit that is in communication with the automatic speech recognition unit, at least two of the partial hypotheses received from the automatic speech recognition unit;

receiving back channel information from one or more listeners, the one or more listeners different than the first speaker;

determining a segment boundary for a translatable segment based on the received back channel information;

resegmenting, by the resegmentation unit, the merged partial hypotheses into the translatable segment in the first language based on the determined segment boundary; and outputting, by a machine translation unit that is in communication with the resegmentation unit and that receives the translatable segment in the first language from the resegmentation unit, a translation of the spoken sound from the first speaker into a second language based on the received translatable segment.

11. The computer-implemented method of claim 10, further comprising:

outputting, by a speech captioning unit that is in communication with the resegmentation unit and that receives the translatable segment in the first language from the resegmentation unit, a caption of the spoken sound from the first speaker in the first language based on the received translatable segment.

12. The computer-implemented method of claim 10, further comprising:

outputting, by a speech index unit that is in communication with the resegmentation unit and that receives the translatable segment in the first language from the resegmentation unit, an index of the spoken sound from the first speaker in the first language based on the received translatable segment.

13. The computer-implemented method of claim 10, wherein determining, by an automatic speech recognition unit, spoken sound from a first speaker in a first language comprises:

retrieving a presentation from an archive, the presentation given by at least the first speaker; and detecting the spoken sound from the first speaker in the first language in the retrieved presentation.

14. The computer-implemented method of claim 10, wherein the back channel information is a sound from a crowd.

15. The computer-implemented method of claim 10, wherein the back channel information is a pause.

16. The computer-implemented method of claim 10, wherein the back channel information is a prosodic cue.

17. The computer-implemented method of claim 10, wherein the segment boundary for the translatable segment is determined based on an additional indicator in addition to the back channel information.

18. The computer-implemented method of claim 17, wherein the additional indicator is end-of-sentence wording.

* * * * *